(No Model.)
C. J. COLEMAN.
ELECTRIC MOTOR.
No. 516,917. Patented Mar. 20, 1894.
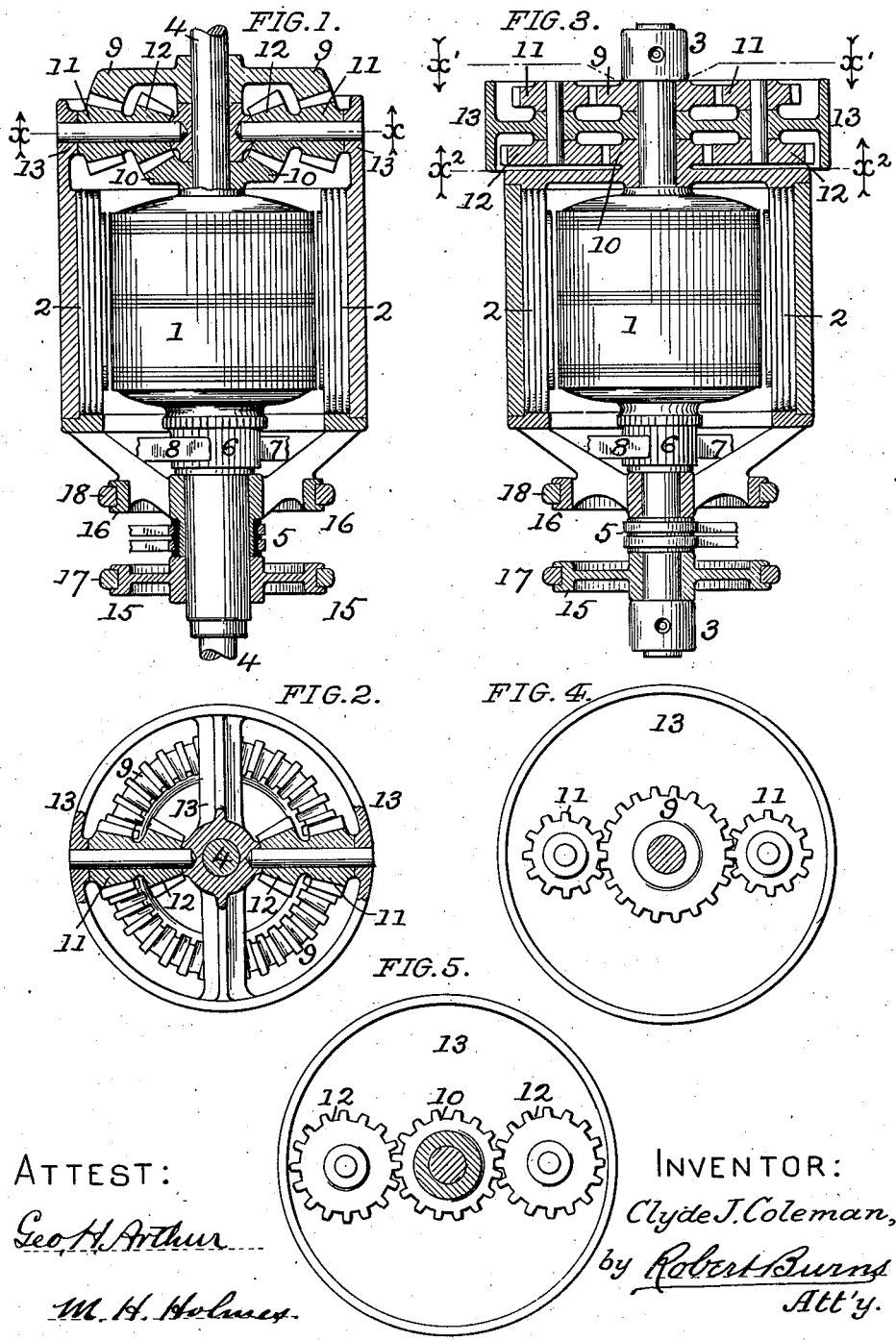
ATTEST:
Geo H Arthur
M. H. Holmes.
INVENTOR:
Clyde J. Coleman,
by Robert Burns
Att'y.

UNITED STATES PATENT OFFICE.

CLYDE J. COLEMAN, OF CHICAGO, ILLINOIS, ASSIGNOR OF ONE-HALF TO CHARLES ODELL, OF SAME PLACE.

ELECTRIC MOTOR.

SPECIFICATION forming part of Letters Patent No. 516,917, dated March 20, 1894.

Application filed January 21, 1893. Serial No. 459,272. (No model.)

*To all whom it may concern:*

Be it known that I, CLYDE J. COLEMAN, a citizen of the United States, residing at Chicago, in the county of Cook and State of Illinois, have invented certain new and useful Improvements in Electric Motors; and I do hereby declare the following to be a full, clear, and exact description of the same, reference being had to the accompanying drawings, forming part of this specification.

The present invention relates to that class of electric motors in which the armature and field are arranged to rotate in opposite directions, and more especially to that type of such motors forming the subject matter of my companion application for Letters Patent, Serial No. 459,271, which embraces a method of coupling the revolving armature and revolving field of an electric motor to a driven shaft in a differential manner, so that the speed of the driven shaft can vary with the load imposed, while the speed of the motor remains constant, and the present improvement has for its objects mainly, to provide a simple and efficient gearing mechanism for connecting the rotating field and the rotating armature of an electric motor to the driven shaft in a differential manner, so that by a variation in the relative speeds of the field and armature, any desired speed can be attained of the driven shaft, and the full power or torque of the motor applied to the driven shaft, regardless of any change or variation in the speed of the same; and in consequence a ready change in the rotation of such driven shaft can be effected to suit the particular circumstances, a decrease in speed being accompanied with an increase of power, and in like manner, an increase in speed with a decrease in power, the power or torque exerted by the motor remaining constant and uniform under all conditions. The resulting advantages from such equalization of the speed and power imparted to the driven shaft are as follows: an attainment of the greatest efficiency in the motor, in that it runs under all conditions at its normal speed; the avoidance of all danger of burning out of the armature coils, due to a decrease in the speed of the motor, owing to an overload, and the requirement of but a normal amount of current for supplying the motor under any ordinary condition of load imposed.

In its more approved form the present improvement contemplates the use of an independent clutch for the revolving armature and the revolving field, so that either one or the other can be held in a stationary condition, in the attainment of the several distinct speeds of the driven shaft as follows, to-wit: a slow speed, due to a revolving armature and a revolving field; a fast speed, due to a revolving armature and a stationary field; and an intermediate speed, due to a stationary armature and revolving field. When however, it is not desired to employ all of such speeds, one of the clutches (the armature clutch for instance), can be dispensed with, and two distinct speeds be still attained, i. e., the fast speed due to a revolving armature and stationary field; and the slow speed due to a revolving armature and a revolving field.

It is an accepted fact among electricians that electric motors will take more current when standing still than when running at their normal speed, owing to the fact that when in motion the motor cuts line of force, and acts as a generator to set up counter electro motive force, to oppose the initial electro motive force, and regulates the amount of current being fed into the motor.

As usually constructed electric motors, when overloaded so that they cannot attain the necessary speed to set up a sufficient counter electro motive force to oppose the initial electro motive force, a larger amount of current than the armature coils were designed to carry will flow through the armature and cause a burning out of the same; to avoid such danger of burning out of the armature, it has heretofore been the usual practice to construct the motor sufficiently large, so that it will readily assume the necessary speed to set up counter electro motive force to sufficiently oppose the initial electro motive force, and avoid "burn outs." By the present invention such a result is attained with a smaller motor, and in a more efficient and practical manner, by allowing the motor to assume its normal speed immediately; the driven shaft or load gradually acquiring its normal speed as its inertia is overcome. At the same time a motor is furnished in which the same amount of current will suffice in the starting as well as the continued operation of the motor; from this uniform current requirement there follows, when applied to street car propulsion and analogous uses, a material reduction in the first cost of the plant as well as in the subsequent running expenses of the same, owing to the fact that the gross amount of electric current to be generated is reduced to a minimum, while the size and cost of the electric generators, steam engine, and other attachments are correspondingly reduced.

The present invention is also specially adapted for very advantageous use in connection with storage batteries for street car propulsion and like uses, in that it does not create an irregular or excessive demand upon the storage batteries, either in the starting of the car, to overcome the inertia of the same, or during the running of the car when extra load is imposed upon the motor, but on the contrary takes a uniform and regular current from the battery at all times, and thus avoids the usual injurious effects on the plates of the storage battery, due to irregular and heavy discharges therefrom, such as the disintegration of the active coating, buckling of the plates, &c.

In the practical use of the present invention a small rheostat may be employed with advantage in the initial starting of the motor so as to aid in a more gradual starting of the same, and which is not required for use at any other time, but such use of a rheostat forms no part of the present invention.

I attain the above objects by the construction and arrangement of parts illustrated in the accompanying drawings, in which—

Figure 1, is a longitudinal sectional elevation of one form of my present improved motor, in which the driven shaft or axle forms the axis upon and around which the armature and field of the motor rotates; Fig. 2, a transverse section of the same at line $x$—$x$, Fig. 1; Fig. 3, a longitudinal sectional elevation illustrating the motor supported in bearings by the shaft of its armature. Figs. 4 and 5, transverse sections at line $x'$—$x'$ and $x^2$ $x^2$, respectively, Fig. 3.

Similar numerals of reference indicate like parts in the several views.

Referring to the drawings, 1, represents the armature, and 2 the field of an electric motor mounted to rotate in opposite directions around a common axis, in any suitable manner, preferably in the manner shown in the drawings, in which the motor field 2, is arranged to rotate in bearings on the shaft or end hubs of the armature; while the armature 1, is either arranged to rotate in suitable bearings on the stationary supporting frame 3, as in Fig. 3, or upon the axially arranged driven shaft or axle 4, as indicated in Fig. 1.

The ordinary current collector 5, commutator 6, and commutator brushes 7 and 8, arranged and operating in any usual manner will be employed for feeding the current to the motor.

In the present invention, a train of epicycle gear is interposed between the revolving armature, 1, the revolving field, 2, and the driven shaft 4; such epicycle gear will consist of a pair of gear wheels having a parallel arrangement on a common axis and made of different diameters, such gear wheels being geared together by means of one or more sets of intermediate or idler gear wheels, fixedly attached together, and turning upon their own axis in bearings in a carrying spider or ring, that in turn has movement around the common or motor axis, so that such intermediate or transmission gear wheels will have two distinct movements to wit: around their own axis, and around the axis of the motor. The transmission gears, connect the respective gears 9 and 10 together, and they may be either of a bevel type as shown Figs. 1 and 2, or of a spur type as shown in Figs. 3, 4, and 5. This improved arrangement of gears constitute what is known as an "epicycle train" of gearing, and the present invention comprehends broadly, the combination therewith of the revolving armature and the revolving field of an electric motor, connected to different members of the epicycle train, regardless of the special connections made, in that either the armature, the field, or the driven shaft or part, may be attached to as a part of either the main gears, or to the carrying spider or rim; the present improvement requiring that such parts of the motor and the driven shaft, be separately connected to the three elements or members of the "epicycle train."

In the drawings I illustrate two modes of connection, to-wit: In Figs. 1 and 2, the motor field 2 is connected to the carrying spider 13, of the transmission gears 11 and 12, of the epicycle train: the armature 1 to gear 10 of such train; and the driven shaft 4 to the other gear 9, of such train. In this construction the driven shaft or axle 4, forms the longitudinal axis of the motor and supports the same, the armature having bearings thereon by means of end sleeves or hubs, while the field in turn, has bearing upon the armature sleeve, and upon the driven shaft by the spider or carrier 13 of the transmission gears 11 and 12 of the epicycle train.

In the construction illustrated in Figs. 3 and 4, the carrying spider 13' of the intermediate or transmission gears 11' and 12' of the epicycle train, is made in the form of a driving pulley, the motor armature 1, is connected to the gear wheel 9' of such train, and the motor field 2 to the other gear wheel 10' of such train. In this construction the motor shaft turns in bearings 3, of a suitable supporting base or housing, and the spider 13' by means of its circular rim or periphery gives off motion.

To effect a change in the speed of the driven shaft 4 from a slow to an intermediate or normal speed, or vice versa, clutch mechanisms are provided in connection with the armature and with the field, for engaging and holding either one of the same in an independent manner, as may be required. Any usual form or type of clutch or brake mechanism may be employed without departing from the spirit of this part of my invention. I have shown for the present purpose, brake wheels 15 and 16, attached respectively, to the armature 1 and to the field 2, and which are engaged by the respective brake bands 17 and 18, that are actuated by any suitable operating mechanism.

With the construction illustrated in Figs. 1 and 2, as an example, the different operations of the parts are as follows: With the armature held stationary by its brake wheel and band 15, 17, and the field running free, a slow motion will be imparted to the driven shaft. With the armature and the field running free in opposite directions, a higher or intermediate speed is imparted to the driven shaft. And with the field held stationary by its brake wheel and band 16, 18, and the armature running free, a normal or high speed is imparted to the driven shaft.

In the practical application of the present invention to uses where the load is constantly changing, such for instance, as in the propulsion of street cars, and assuming the driven shaft 4 to represent the car axle, or a rotating element, geared to and driving the car axle, in starting the car, the current is switched directly into the motor, and the brake mechanism 15, 17, of the armature applied to hold the armature from rotation. Under such conditions the rotating field 2 accomplishes the work, and exerts a slow and powerful action to overcome the inertia of the car and set the same in motion, without requiring any excess in the amount of current above the ordinary, and without any liability to overloading the motor to cause a burning out of the same. In this the armature gear 10, remaining stationary, its teeth serve as a fulcrum for the pinion 12, to cause said pinion to have a movement around its axis, as said pinion is carried by the field around the main axis, and such compound movement of the pinion 12, around its own axis, and around the main axis, is by means of the pinion 11, (integral with pinion 12,) transferred to the driven pinion 9, on the car or other axle, the resultant speed of such axle depending upon the relative diameters of the gears, wheels 9 and 10. After the inertia of the car has been overcome by the slow and powerful motion above mentioned, the armature can be released from its holding brake mechanism 15, 17, and allowed to rotate freely in an opposite direction to the field. Under such conditions, both the field and the armature will have effective action through the epicycle train of gears to impart a higher or intermediate speed to the car, in this the same conditions will prevail as already described, modified by the fact that the stationary fulcrum of the former arrangement is converted into a movable fulcrum, imparting additional speed to the driven pinion 9, on the car axle and when a high or normal speed of the car is required the brake mechanism 16, 18, can be applied to the field 2, so as to hold it from rotation, when the armature will act to impart the required normal speed to the car. In this the epicycle nature of the train of gearing is eliminated, and the motion transmitted from the armature to the driven shaft 4, will depend upon the relative proportions of the gear wheels 9 and 10.

The use of the armature of the motor for imparting the normal or high speed above referred to, is preferred as entailing the least amount of loss through friction, &c., it is however, within the scope of the present invention to reverse the arrangement described and employ the revolving field in the attainment of such normal speed, when desired.

Having thus fully described my said invention, what I claim as new, and desire to secure by Letters Patent, is—

1. A motor having its field and armature adapted to rotate in opposite directions, independently of the driven shaft or drum in combination with an epicycle train of gears forming a connection between the field, the armature and the driven shaft or drum, the carrying frame of such epicycle train of gears having a constant or positive connection with a power transmitting part of the motor, substantially as set forth.

2. A motor having its field and armature adapted to rotate in opposite directions independently of the driven shaft or drum, in combination with an epicycle train of gears, having a differential nature, and forming a connection between the field, the armature, and the driven shaft or drum the carrying frame of such epicycle train of gears having a constant or positive connection with a power transmitting part of the motor, substantially as set forth.

3. A motor having its field and armature adapted to rotate in opposite directions independently of the driven shaft or drum, in combination with an epicycle train of gears, forming a connection between the field, the armature and the driven shaft or drum the carrying frame of such epicycle train of gears having a constant or positive connection with a power transmitting part of the motor, and a clutch mechanism for holding one of the motor members from rotation, substantially as set forth.

4. A motor having its field and armature adapted to rotate in opposite directions, in combination with an epicycle train of gears, forming a connection between the field, the armature, and the driven shaft or drum, and a clutch mechanism for holding the field from rotation, substantially as set forth.

5. A motor having its field and armature adapted to rotate in opposite directions, in combination with an epicycle train of gears, forming a connection between the field, the armature and the driven shaft or drum, and clutch mechanisms for independently holding the field and armature from rotation, substantially as set forth.

6. A motor having its field and armature adapted to rotate in opposite directions independently of the driven shaft or drum, in combination with an epicycle train of gears having a differential nature, and forming a connection between the field, the armature and the driven shaft or drum the carrying frame of such epicycle train of gears having a constant or positive connection with a power transmitting part of the motor, and clutch mechanism for holding one of the motor members from rotation, substantially as set forth.

7. A motor having its field and armature adapted to rotate in opposite directions, in combination with an epicycle train of gears, having a differential nature, and forming a connection between the field, the armature and the driven shaft or drum, and clutch mechanism for holding the field from rotation, substantially as set forth.

8. A motor having its field and armature adapted to rotate in opposite directions, in combination with an epicycle train of gears, having a differential nature, and forming a connection between the field, the armature and the driven shaft or drum, and clutch mechanisms for independently holding the field and armature from rotation, substantially as set forth.

In testimony whereof witness my hand this 16th day of January, 1893.

CLYDE J. COLEMAN.

In presence of—
  ROBERT BURNS,
  GEO. H. ARTHUR.